United States Patent [19]

Leroux et al.

[11] Patent Number: 5,017,062

[45] Date of Patent: May 21, 1991

[54] TOOL FOR PRECISION MACHINING

[75] Inventors: Jacques Leroux, Annecy Le Vieux; Francois Gallez, Annecy, both of France

[73] Assignee: Serdi - Societe D'Etudes De Realisation Et De Diffusion Industrielles, Annecy, France

[21] Appl. No.: 526,905

[22] Filed: May 22, 1990

[30] Foreign Application Priority Data

May 22, 1989 [FR] France ................................. 89 06970
Jun. 22, 1989 [FR] France ................................. 89 08580

[51] Int. Cl.[5] .......................... B23C 1/20; B23B 41/00
[52] U.S. Cl. .................................. 409/179; 408/83.5
[58] Field of Search ............... 409/185, 201, 178, 179, 409/175, 184; 408/83.5, 712, 708

[56] References Cited

U.S. PATENT DOCUMENTS

| 1,761,326 | 6/1930 | Campbell | 408/83.5 |
| 1,882,689 | 10/1932 | Albertson | 409/82 |
| 1,923,847 | 8/1933 | Seelert | 408/83.5 |
| 3,443,480 | 5/1969 | Wells | 408/83.5 |
| 3,516,329 | 6/1970 | Rendahl | 408/83.5 |
| 3,522,758 | 8/1970 | Minelli et al. | 409/185 |
| 4,899,458 | 2/1990 | Minelli | 408/83.5 X |

FOREIGN PATENT DOCUMENTS

| 0344077 | 11/1989 | European Pat. Off. . |
| 1220437 | 5/1960 | France . |
| 1555211 | 1/1969 | France . |
| 8001365 | 7/1980 | PCT Int'l Appl. . |

Primary Examiner—William Briggs
Attorney, Agent, or Firm—Oliff & Berridge

[57] ABSTRACT

The present invention relates to a tool for precision machining, for example for the grinding of thermal-engine valve seats. The tool according to the invention comprises a housing (2), a sleeve (3) equipped with a spherical orientation plug (3a) mounted inside the housing, a one-piece machining shaft (6) mounted freely in terms of rotational and translation motion in the sleeve, and a means for adjusting the height of the shaft (6), comprising a means for fixing said shaft in terms of rotation to a bush (17) movable in terms of translational motion relative to the sleeve.

9 Claims, 2 Drawing Sheets

TOOL FOR PRECISION MACHINING

BACKGROUND OF THE INVENTION

The present invention relates to a tool for precision machining By precision machining is meant any working of a metal part with a cutting tool, whether boring, milling, tapping, grinding, or any other type of metal-working with removal of a chip, or whether an abrasive tool with removal of metal particles are concerned.

The present invention is presented, described and defined by reference to the grinding of valve seats of thermal engines, but it must be understood that its interpretation and scope are not intended to be limited to this sector of use, since, as indicated by the term "precision machining", the invention applies to other types of metal-working.

DESCRIPTION OF THE PRIOR ART

In the sector of the grinding of valve seats there is already known a tool comprising in general:
a housing,
a means for fixing the housing relative to the part to be machined, that is to say the cylinder head of the thermal engine,
a sleeve equipped with a spherical orientation plug which is mounted inside the housing; the sleeve has a transverse bore, the axis of which passes through the center of the spherical plug,
two seats of concave sphericity complementary with the spherical plug and arranged inside the housing on either side of said plug,
a spindle mounted freely in terms of rotational and translational motion in the transverse bore of the housing; the latter possesses respectively, on either side of the spherical plug, two orifices each allowing the passage and movement of the spindle,
a pilot rod coaxial with the axis of the spindle, extending the latter at one end and intended for penetrating with an exact fit into a reference hole, that is to say the guide of a valve stem,
a means for blocking the sleeve in terms of orientation,
a rotary machining tool mounted at the end of the spindle on the same side as the pilot rod by means of a toolholder device,
a means, called a "pass setter", for adjusting the height of the spindle together with the pilot rod in relation to the sleeve: this means is mounted on said sleeve outside the housing and opposite to the machining tool,
a mechanical or manual means for driving in rotation, outside the housing and opposite to the machining tool.

SUMMARY OF THE INVENTION

The subject of the present invention is a tool of the type defined above, designed for the grinding of valve seats of low-power thermal engines such as those of lawnmowers or portable power-generating units.

According to the present invention, in combination:
(a) the spindle and the pilot rod are constructed in one piece according to one and the same interchangeable machining shaft, comprising in terms of its height a first part or hub, forming the spindle, having a nominal diameter and a second part of smaller diameter forming the pilot rod,
(b) the part or parts of said tool which are located outside the housing and on the opposite side to the machining tool, for example the height adjustment means of the machining shaft, together define a hole for the extraction of said machining shaft, aligned along the axis of the transverse bore of the sleeve and of a diameter at least equal to the nominal diameter,
(c) the means for adjusting the height of the machining shaft comprises, on the one hand, a bush for rotational coupling to the hub of the machining shaft, movable in terms of translational motion relative to the sleeve and, on the other hand, a reversible means for blocking the bush in terms of rotation relative to the hub, such as a screw, accessible to a manipulation by the user from outside.

By means of the invention, with the tool in place, it becomes possible to interchange the machining shaft and therefore the pilot rod, whilst at the same time leaving the tool permanently on the cylinder head. For this purpose, it is sufficient to have access to the means for blocking the bush in terms of rotation relative to the hub and to release these two elements in terms of rotation and then extract the machining shaft outside the housing via the cylindrical hole formed by the alignment of the transverse bore of the sleeve and of the hole for extracting the parts located outside the housing.

Such a function proves especially useful in the case of the machining of small thermal engines, for which it proves necessary to secure the tool to the cylinder head.

Still, according to the invention, by providing a set of machining shafts all comprising a hub of the nominal diameter of the transverse bore of the sleeve and parts forming a pilot rod of respectively different diameters, the professional can easily interchange and fit the machining shaft and therefore the pilot rod to the guide of the valve stem, relative to which he is to grind the seat.

By means of the invention, the freedom in terms of translational motion over the height of the machining shaft makes it possible not only to extract it completely from the tool, but also adjust its height in relation to the part to be machined; for this purpose, it is sufficient to release the machining shaft relative to the coupling bush. The entire machining shaft can then slide freely in relation to the rest of the tool and be arranged by the user at a height compatible with the position of the guide of the seat to be ground, where the pilot is concerned, and with the position of the seat, where the tool is concerned.

Such a tool according to the invention proves especially simple to use or handle, particularly because of the possibility of extraction and the interchangeability of the machining shaft and therefore of the pilot rod, whilst at the same time leaving the tool in place and secured, for example, to the parting plane of the cylinder head of the thermal engine or the cylinder head.

The height adjustment means, called a "pass setter", essentially allows the progressive lowering of the machining tool at the rate at which the grinding operation is carried out. Moreover, its height travel can be completely inadequate for positioning the tool in terms of height before or during machining. If this travel is insufficient, the machining shaft can then be disconnected in terms of rotation, adjusted in terms of height and connected once again to the coupling bush (11).

Furthermore, these various adjustments are made easier because the machining shaft, comprising in one piece the pilot rod and the spindle, is accessible to the user, on the one hand from the top and on the other hand via the connection means or mount of the tool.

BRIEF DESCRIPTION OF THE DRAWINGS

The present invention is now described with reference to the accompanying drawings, in which.

DESCRIPTION OF THE PREFERRED EMBODIMENTS

Figures 1, 2:
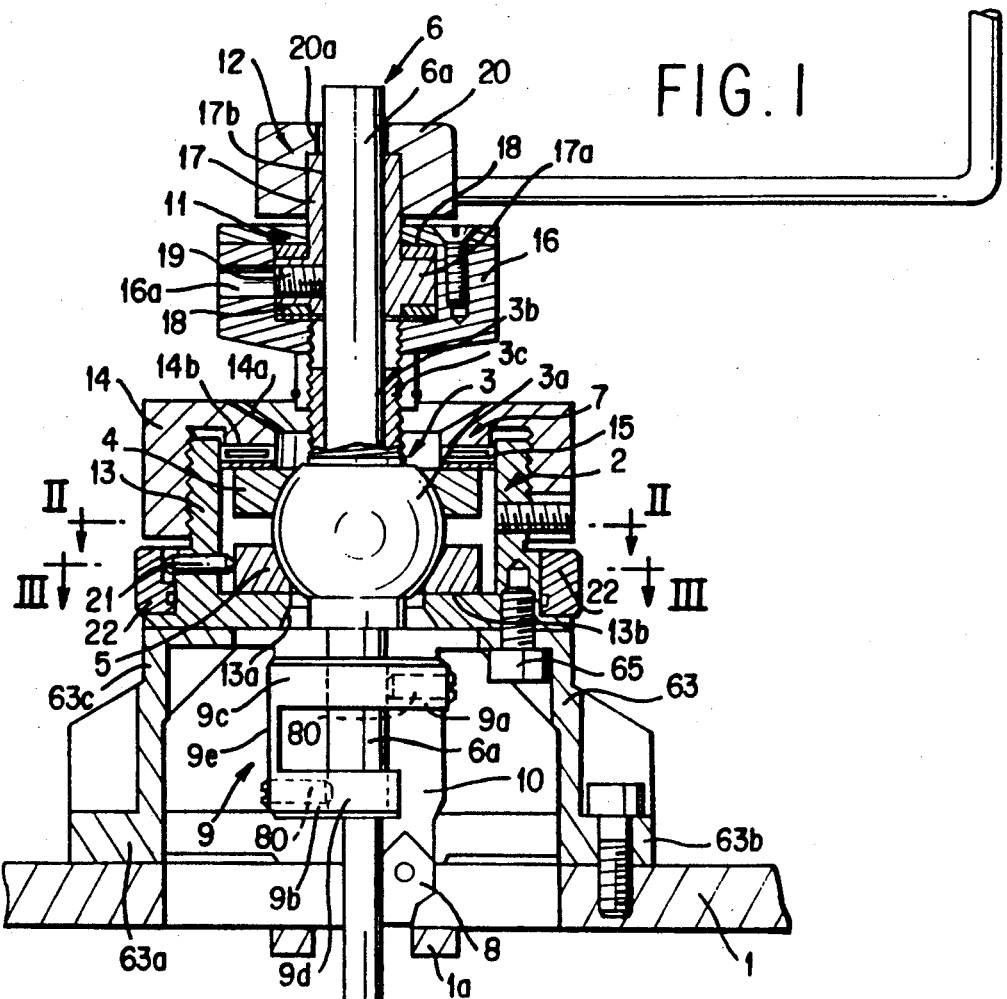
FIG. 1 shows a front view of a tool according to the invention, with partial cutaways along a plane passing through the axis of the spindle.
FIG. 2 shows a sectional view of the upper part of the tool, indicating a setting of the machining shaft and therefore of the spindle in the lower end position.
Figure 3:
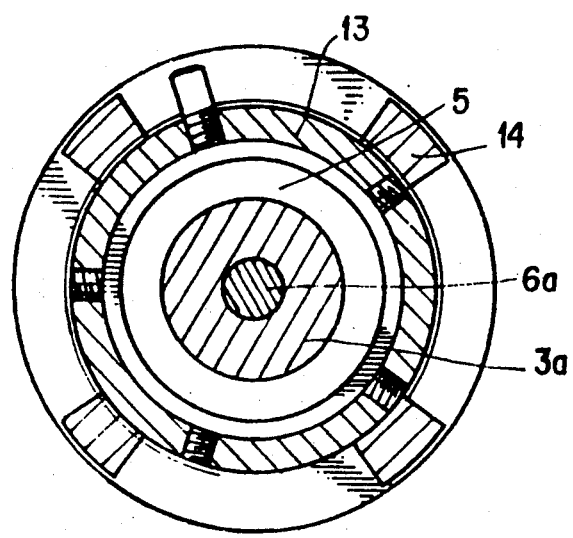
FIG. 3 shows a sectional view of the same tool along the line II—II of FIG. 1.
Figure 4:
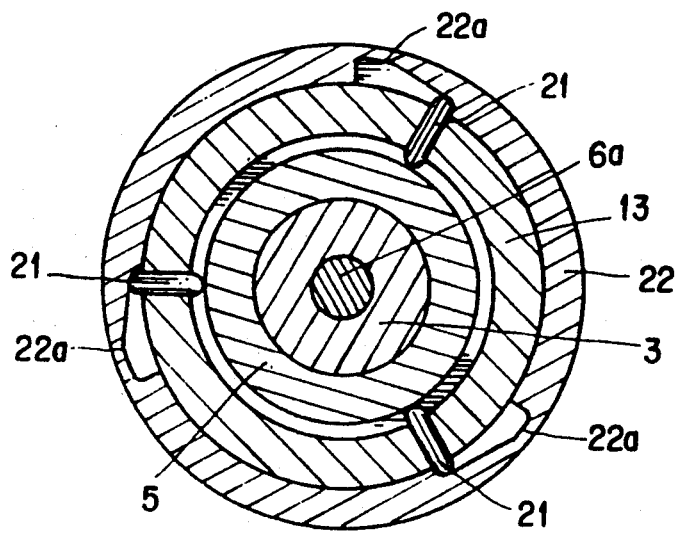
FIG. 4 shows a sectional view of the same tool along the line III—III of FIG. 1.
Figure 5:
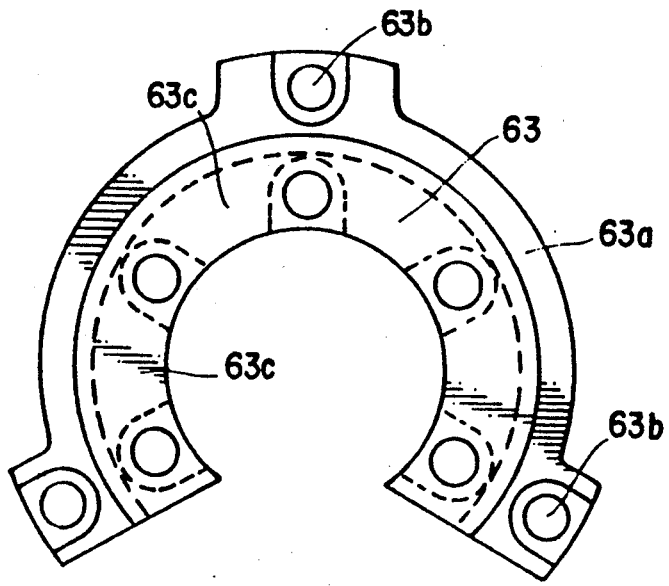
FIG. 5 shows a top view of the connection means or support belonging to the tool according to FIGS. 1 to 4.

According to FIG. 1, the reference numeral 1 denotes a thermal-engine cylinder head having a valve seat (1a) to be formed or ground, coaxially with a valve-stem guide (1b).

A tool according to the invention comprises the following main elements:

a housing (2),
a means (63) for the connection or support of the housing (2) relative to the cylinder head (1) to be machined,
a sleeve (3) equipped with a spherical orientation plug (3a) mounted inside the housing (2), this sleeve having a transverse bore (3b), the axis of which passes through the center of the plug (3a),
two seats (4) and (5) of concave sphericity complementary with the spherical plug (3a) and arranged inside the housing on either side of the plug,
a one-piece machining shaft (6) comprising, in terms of its height, a first part (6a) or hub forming the spindle, having a predetermined nominal diameter, and a second part (6b) of smaller diameter forming the pilot rod,
a means (7) for blocking the sleeve (3) in terms of orientation and position, as described below,
a rotary machining tool (8) mounted at the end of the spindle (6a) on the same side as the pilot rod (6b), on the one hand by means of an adaptor piece (9) mounted and wedged in terms of rotation on the hub or spindle (6a) at the end of the latter and on the same side as the pilot rod (6b) and on the other hand by means of a toolholder device (10) mounted vertically on the adaptor piece (9) and supporting the actual tool (8),
a means (11) for adjusting the height of the machining shaft (6) and therefore of the spindle (6a) in relation to the sleeve (3); this means (11) is mounted on the sleeve (3) outside the housing (2) and opposite to the machining tool (8),
a means (12) for driving the machining shaft (6) in rotation, still outside the housing (2) above the height adjustment means (11) and opposite the machining tool (8).

The housing (2) of cylindrical form, the axis of which passes through the center of the spherical plug (3a), comprises two parts mounted one on the other, namely a pot (13) having an external thread (13a) and a cover (14) in the form of a nut screwable onto the pot (13) in an adjustable way. On either side of the spherical plug (3a), the housing has two respective orifices, namely (14a) in the cover (14) and (13a) in the pot (13); each of these orifices allows the passage of the spindle (6a) with an angular movement, as described below. The two seats (4 and 5), outside their concave spherical surface in contact with the plug (3a), each have the form of a cylindrical washer. The lower seat (5) is movable in a reference plane on the plane inner surface (13b) located inside the pot (13) and therefore inside the housing (2). The upper seat (4) rests freely on the spherical plug (3a). Moreover, the cover or nut has an annular bearing surface (14b) located inside the housing (2) and, during screwing, bearing against the upper seat (4) by means of a needle bearing (15).

The means (11), or pass setter, for adjusting the height of the machining shaft (6) comprises, on the one hand, an adjustable nut (16) screwed onto a threaded bush (3c) belonging to the sleeve (3) and, on the other hand, a bush (17) for rotational coupling to the hub (6a) of the machining shaft and mounted freely in terms of rotation on the nut (16). This freedom in terms of rotation is obtained by means of a radial rib (17a) belonging to the coupling bush (17) and of two friction rings (18) on either side of the rib (17a), in a receptacle provided for this purpose in the nut (16). The radial rib (17a) has an internal thread for the passage of a screw (19) for blocking the coupling bush (17) in terms of rotation relative to the hub (6a). The nut (16) has a radial bore (16a) giving access to the receptacle containing the rib (17a) of the coupling bush (17); as a result of the rotation of the nut (16) relative to the rib (17a), it is possible to bring the bore (16a) into coincidence with the head of the screw (19) and consequently block or release the latter reversibly, in order to release or block the hub (6a) in relation to the bush (17).

The means (12) for driving in rotation consists of a crank, the head (20) of which is mounted permanently and is blocked in terms of rotation on the coupling bush (17) by means of a flat (not shown). The head (20) has a transverse bore (20a) allowing the extraction of the machining shaft (6), as described below.

As shown in FIG. 1, the parts of the tool which are located on the outside of the housing (2) and on the opposite side to the machining tool (8), namely the coupling bush (17) belonging to the height adjustment means (11) of the machining shaft (6), and the crank head (20) together define a hole for the extraction of the shaft (6), formed by the alignment of the bore (17b) of the bush (17) and of the bore (20a) of the head (20), along the axis of the transverse bore (3b) of the sleeve (3), the diameter of these various bores being at least equal to that of the hub (6a) outside the sleeve (3).

In order to center the spherical plug (3a) at the start of a machining operation, the housing (2) and more specifically the pot (13) possess, on the one hand, three studs (21) for centering the movable seat (5), which are arranged radially at 120° relative to one another and which are movable in terms of translational motion in relation to the housing (2) and, on the other hand, an actuating ring (22) arranged concentrically on the outside of the housing (2) and comprising three inner ramps (22a), capable, as a result of rotation in a predetermined direction, of ensuring a radial push of the three studs (22) respectively towards the center of the housing.

As regards the means (63) for connecting the housing (2), this consists of a support removable relative to the latter. This support comprises, on one side, a mount (63a) with bores (63b) for pins for assembly on the cylinder head (1) to be machined and, on the other side, a table (63c) for receiving and fastening the housing (2) by means of screws (65). Thus, it is possible to use the same tool, more specifically the various parts other than the support (63), for different cylinder heads or engines, by adapting the support (63) each time.

The functioning of a tool according to the invention is inferred from the preceding description and can be recalled briefly in terms of the following operating phases:

by unscrewing the cover (14), the seats (4, 5) are released relative to one another, and the assembly consisting of the spherical plug (3a) in contact with the two seats (4, 5) is freed relative to the sliding surface (13b), by rotating the ring (22) in the counterclockwise direction, the seat (5) and consequently the plug (3a) and the upper seat (4) resting on the latter are centered; by rotating the ring in the other direction, the centered seat (5) is released, when the tool has been secured to the cylinder head (1) by means of the support (63), the pilot rod (6b) is positioned in the guide (1b), thereby determining the orientation of the plug (3a) and its position relative to the sliding plane (13b), by screwing the cover (14), the bearing (14b) clamps the two seats (4 and 5) both against the plug (3a) and against the inner surface (13b), from the blocked position thus obtained, by adjusting the nut (16) the machining tool (8) is brought into contact with the surface (1a) to be ground, by rotating the crank, it is then possible to machine the seat (1a).

The adaptor piece (9) has the form of a stirrup comprising two annular wings (9c, 9d) or plates which are arranged perpendicularly relative to the machining shaft (6) and which are connected to one another by means of a web (9e) or rigid part. These two wings have two central open-ended threaded holes (9a, 9b) arranged respectively radially relative to the axis of the machining shaft (6), forming an angle of 180° between them, offset in terms of height relative to one another and each equipped with a screw (80) for blocking in terms of rotation.

The possibility of relative sliding between the adaptor piece (9) and the spindle (6a) allows an independent or complementary adjustment of the machining tool (8) in relation to the seat (1a).

This arrangement of the adaptor piece (9) makes it possible to balance the machining forces, whilst at the same time allowing a reversible fastening relative to the spindle.

We claim:

1. A tool for precision machining, for example for the grinding of thermal-engine valve seats, comprising:
    a housing,
    a means for fixing the housing relative to the part to be machined, for example the cylinder head of the thermal engine,
    a sleeve equipped with a spherical orientation plug mounted inside the housing,
    two seats of concave sphericity complementary with the spherical plug and arranged inside the housing on either side of said plug,
    a spindle mounted freely in terms of rotational and translational motion in the transverse bore of the sleeve, the housing possessing respectively, on either side of the spherical plug, two orifices each allowing the passage of the spindle with movement,
    a pilot rod coaxial with the axis of the spindle, extending the latter at one end and intended for penetrating with an exact fit into a reference hole, for example the guide of a valve stem,
    a means for blocking the sleeve in terms of orientation,
    a rotary machining tool mounted at the end of the spindle on the same side as the pilot rod,
    a means for adjusting the height of the spindle together with the pilot rod in relation to the sleeve, said means being mounted on the latter outside the housing and opposite to the machining tool,
    a means for driving the spindle together with the pilot rod in rotation, at the end of the housing and opposite to the machining tool,
    wherein, in combination:
    (a) the spindle and the pilot rod are constructed in one piece to form an interchangeable machining shaft, comprising in terms of its height a first part or hub, forming the spindle, having a nominal diameter, and a second part of smaller diameter forming the pilot rod,
    (b) the part or parts of said tool which are located outside the housing and on the opposite side to the machining tool, and especially the height adjustment means of the machining shaft, together define a hole for the extraction of said machining shaft, aligned along the axis of the transverse bore of the sleeve and of a diameter at least equal to the nominal diameter,
    (c) the means for adjusting the height of the machining shaft comprises, on the one hand, a bush for rotational coupling to the hub of the machining shaft, movable in terms of translational motion relative to the sleeve and, on the other hand, a reversible means for blocking the bush in terms of rotation relative to the hub, accessible to a manipulation by the user from outside.

2. The tool as claimed in claim 1, which is associated with a set of machining shafts, all comprising a hub of the nominal diameter and parts forming a pilot rod of respectively different diameters.

3. The tool as claimed in claim 1, wherein the height adjustment means comprises an adjustable nut screwed onto a threaded bush belonging to the sleeve, the coupling bush being mounted freely in terms of rotation on said nut, and the latter having a radial bore for access to the reversible means, such as a screw, for blocking said bush in terms of rotation relative to said means.

4. The tool as claimed in claim 1, wherein the means for driving the machining shaft in rotation consists of a crank, the head of which is mounted permanently and blocked in terms of rotation on the coupling bush and has a transverse bore for extraction of the machining shaft.

5. The tool as claimed in claim 1, wherein the means for connecting the housing consists of a support removable relative to said housing, comprising, on one side, a mount with bores for pins for assembly on the part to be machined and, on the other side, a table for receiving and fastening the housing.

6. The tool as claimed in claim 1, wherein the housing possesses, on the one hand, three studs for centering the movable seat, which are arranged radially at 120° relative to one another and which are movable in terms of translational motion relative to the housing and, on the other hand, an actuating ring arranged concentrically outside the housing and having three inner ramps for a radial push towards the center of the housing, related respectively to the three studs.

7. The tool as claimed in claim 1, wherein the housing comprises, on the one hand, a pot having the inner surface for the sliding of one of the seats in its plane and, on the other hand, a cover screwable onto the housing and having an inner annular bearing surface bearing by screwing against the other seat, especially by means of a needle bearing.

8. The tool for precision machining as claimed in claim 1, wherein an adaptor piece is mounted at the end of the hub or spindle of the machining shaft on the same side as the pilot rod and supports the machining tool in terms of rotation, said adaptor piece being wedged in terms of rotation on the hub, whilst at the same time allowing the single interchangeable machining shaft to be extracted via the hole for the extraction of the parts located outside the housing, and in that the adaptor piece has two open-ended threaded holes arranged radially relative to the axis of the machining shaft, forming an angle of 180° between them, offset in terms of height relative to one another and each equipped with a screw for blocking in terms of rotation.

9. The tool as claimed in claim 8, wherein the adaptor piece has the form of a stirrup comprising two wings arranged perpendicularly relative to the machining shaft and connected to one another by means of a web, the two wings respectively having the two open-ended threaded holes.

* * * * *